(12) United States Patent
Colliver et al.

(10) Patent No.: US 7,799,364 B2
(45) Date of Patent: Sep. 21, 2010

(54) METHOD FOR THE MANUFACTURE OF A GREEN TEA PRODUCT

(75) Inventors: Steven Peter Colliver, Sharnbrook (GB); Michael Alan Cooper, Sharnbrook (GB); Allen Griffiths, Sharnbrook (GB); Alan David Peilow, Sharnbrook (GB); David George Sharp, Sharnbrook (GB)

(73) Assignee: Conopco Inc., Englewood Cliffs, NJ (US)

( * ) Notice: Subject to any disclaimer, the term of this patent is extended or adjusted under 35 U.S.C. 154(b) by 623 days.

(21) Appl. No.: 11/651,284

(22) Filed: Jan. 9, 2007

(65) Prior Publication Data
US 2007/0160737 A1 Jul. 12, 2007

(30) Foreign Application Priority Data

Jan. 12, 2006 (EP) .................................. 06250152
Sep. 14, 2006 (EP) .................................. 06120701

(51) Int. Cl.
A23F 3/00 (2006.01)
(52) U.S. Cl. ........................ 426/597; 426/435; 426/433; 426/534
(58) Field of Classification Search ........................ None
See application file for complete search history.

(56) References Cited

U.S. PATENT DOCUMENTS

| 3,477,854 | A | 11/1969 | Vuataz et al. |
| 3,765,904 | A | 10/1973 | de Roissart et al. |
| 3,966,986 | A | 6/1976 | Hunter et al. |
| 4,130,669 | A | 12/1978 | Gregg |
| 4,167,589 | A | 9/1979 | Vitzthum et al. |
| 4,880,656 | A | 11/1989 | Schuetz et al. |
| 5,182,926 | A | 2/1993 | Carns et al. |

FOREIGN PATENT DOCUMENTS

| EP | 0 294 177 | 8/1992 |
| GB | 236 902 A | 10/1925 |
| GB | 1097661 | 1/1968 |
| GB | 1117102 | 6/1968 |
| GB | 1209055 | 10/1970 |
| GB | 1306017 | 2/1973 |
| GB | 1333362 | 10/1973 |
| GB | 1466881 | 3/1977 |
| JP | 58076046 A * | 5/1983 |
| JP | 2002/330698 | 5/2001 |
| JP | 2005/143467 | 11/2003 |
| JP | 2005/160416 | 12/2003 |
| WO | 98/23164 | 6/1998 |
| WO | 03/101215 | 12/2003 |
| WO | 2005/039301 | 5/2005 |

OTHER PUBLICATIONS

European Search Report on Application No. EP 06 25 0152 dated Jul. 5, 2006.
European Search Report on Application No. EP 06 12 0701 dated Jan. 26, 2007.
International Search Report on International Application No. PCT/EP2006/012071 dated Mar. 13, 2007.
K. Yamaguchi and T. Shibamoto; *J. Agric. Food Chem.*, 1981, 29, pp. 366-370.
M. Shimoda et al.; *J. Agric. Food Chem.*, 1995, 43, pp. 1621-1625.
M. Kato and T. Shibamoto; *J. Agric. Food Chem.*, 2001, 49, pp. 1394-1396.
"Tea: Cultivation to Consumption", K.C. Willson and M.N. Clifford (Eds), 1st Edn, 1991, Chapman & Hall (London), Chapter 13, p. 422.
N. Togari et al., *Food Research International*, 1995, 28, pp. 495-502.
N. Togari et al., *Food Research International*, 1995, 28, pp. 485-493.
Patent Abstracts of Japan for 2002-330698 dated Nov. 2002.
Patent Abstracts of Japan for 2000-135059 dated May 2000.
Patent Abstracts of Japan for 2002-171908 dated Jun. 2002.
Patent Abstracts of Japan for 2003-261895 dated Sep. 2003.
Co-pending application for Bagaria et al.; U.S. Appl. No. 11/521,214, filed Sep. 14, 2006.
Zhengkta et al., "*Study on the Chemical Constituents of Volatile Oil From Fresh Tea Leaves*", Acta Botanioa Sinica. vol. 24, No. 5, Sep. 1982, pp. 1-12.
Hatanaka, "*About Leaf Alcohol Part I*", Kagako to Seibutsu, vol. 14, No. 12, (1976), pp. 788 to 793).

* cited by examiner

*Primary Examiner*—Jennifer C McNeil
*Assistant Examiner*—Hong Mehta
(74) *Attorney, Agent, or Firm*—Rimma Mitelman

(57) ABSTRACT

The present invention provides a method of manufacturing a green tea product with enhanced aroma. The method comprises the steps of: providing an aroma composition comprising E-2-hexenal and linalool in a weight ratio of at least 0.7:1; and combining the aroma composition with the tea product. Also provided are green tea products with enhanced aroma.

18 Claims, No Drawings

METHOD FOR THE MANUFACTURE OF A GREEN TEA PRODUCT

TECHNICAL FIELD OF THE INVENTION

The present invention relates to green tea products with enhanced aroma and methods for the manufacture of such products.

BACKGROUND OF THE INVENTION

Green tea is a popular beverage which has been consumed in China and Japan for many hundreds of years. Recently, extensive laboratory research and epidemiologic studies have shown that compounds present in green tea (particularly the catechins) may reduce the risk of a variety of illnesses. These studies, along with the increasing complexity of the consumer's palate has led to increased consumption of green tea, even in markets (such as the USA and Western Europe) where there is no tradition of green tea consumption.

The aroma of green tea is seen as an important indicator of quality. There have been many investigations into the compounds responsible for particular odours of green tea and it is conventionally held that E-2-hexenal, in particular, is characteristic of the undesirable "green note" of low-grade teas, whilst linalool is characteristic of the aroma of high grade teas.

K. Yamaguchi and T. Shibamoto (*J. Agric. Food Chem.*, 1981, 29, pp. 366-370) studied the volatile components of Gyokuro (a high grade green tea) and showed that linalool was a major component thereof whilst E-2-hexenal was only present in very low amounts.

M. Shimoda et al. (*J. Agric. Food Chem.*, 1995, 43, pp. 1621-1625) studied the contributors to the odours of different grades of green tea and their relationship to the odours of their infusions. Linalool was found to contribute to floral and fruity aromas while E-2-hexenal was said to give a green and sickening odour. High grade Sen-cha contained only trace amounts of E-2-hexenal and had a significant amount of linalool, whilst low-grade sencha comprised approximately 71 µg/kg of linalool and 15 µg/kg E-2-hexenal.

M. Kato and T. Shibamoto (*J. Agric. Food Chem.*, 2001, 49, pp. 1394-1396) studied a range of green teas and found that the relative level of linalool is higher in high-quality tea than in low-quality tea. Furthermore, an appreciable amount of E-2-hexenal was found in low-quality tea but not in high quality tea.

JP 2002-330698 A (KOJIMA MAKOTO) discloses a method capable of collecting inherent grassy-smelling flavor components of green tea. The method comprises leading an exhaust gas discharged from a firing dryer in the finish processing step of raw tea leaves. The inherent grassy-flavor components of green tea can be added to green tea beverage products by using the obtained condensed tea flavor component-containing product. There is no disclosure, however, of E-2-hexenal or linalool. Furthermore, by the time that fresh leaves are fired in the finish processing step of green tea manufacture, they have already been dried to a moisture content of much less than 30% (see, for example, "Tea: Cultivation to Consumption", K. C. Willson and M. N. Clifford (Eds), 1$^{st}$ Edn, 1992, Chapman & Hall (London), Chapter 13, p. 422). Thus much of the E-2-hexenal will already have been lost before the tea leaves reach the firing dryer.

Surprisingly, we have found that adding an aroma composition relatively high in E-2-hexenal to a green tea product actually enhances the aroma of the green tea product. The resulting green tea products were found to have a relatively high content of E-2-hexenal and yet have an aroma enriched in floral and citrus notes and reduced in the green notes typical of low-quality teas.

Tests And Definitions

Beverage

As used herein the term "beverage" refers to a substantially aqueous drinkable composition suitable for human consumption.

Tea

"Tea" for the purposes of the present invention means material from *Camellia sinensis* var. *sinensis* and/or *Camellia sinensis* var. *assamica*.

"Tea leaf" for the purposes of this invention means a tea product that contains one or more tea origins in an uninfused form.

"Fresh tea leaf" refers to tea leaf that has never been dried to a water content of less than 30% by weight, and usually has a water content in the range 35 to 90%.

"Leaf tea product" refers to tea leaf that has been dried to a moisture content of less than 30% by weight, and usually has a water content in the range 1 to 10% by weight (i.e. "made tea"). The leaf tea product of this invention is a beverage precursor that is in a form suitable for directly preparing a beverage, e.g. by contacting the leaf tea product with an aqueous medium such as boiling water or cold water. The leaf tea products of this invention are preferably packaged. The leaf tea products may be packaged in an infusion package (e.g. tea bag) and/or an air tight envelope such as a foil bag.

"Fermentation" refers to the oxidative and hydrolytic process that tea undergoes when certain endogenous enzymes and substrates are brought together, e.g., by mechanical disruption of the cells by maceration of the leaves. During this process colourless catechins in the leaves are converted to a complex mixture of yellow and orange to dark-brown polyphenolic substances. "Green tea" refers to substantially unfermented tea.

By "ready-to-drink tea" is meant a beverage comprising tea solids. Ready-to-drink tea usually has a water content of at least 80%, optimally between 85 and 99.9% by weight. Ready-to-drink tea may be packaged in an air tight container such as a can or bottle. The tea solids content of ready-to-drink tea is typically in the range of 0.001 to 5% by weight, preferably 0.01 to 3% by weight and most preferably 0.1 to 1% by weight.

Total Organic Carbon

The total organic carbon (TOC) content of an aroma composition is a measure of the total concentration of aroma compounds in the composition. Analysis of TOC is based upon a combustion method.

The TOC measurements were made using a Shimadzu TOC-V Carbon Analyser, an automated system that analyses aqueous samples for Total Carbon (TC) and Total Inorganic Carbon (TIC). The combustion tube is filled with platinum catalyst and heated to 680° C. Carrier gas (purified air) is supplied to this tube. A sample is injected and all the carbon oxidised to $CO_2$ which is measured using an infra-red analyser.

TOC is measured by using a 'by difference' method whereby Total Carbon (TC) and the Total Inorganic Carbon (TIC) of a sample are measured, the difference being the Total Organic Carbon (TOC). The aroma compositions do not contain inorganic carbon and therefore the TC data has been used as a direct measure of TOC.

Determination of Aroma Compounds

The amounts of the various aroma compounds in aroma compositions and green tea products are determined by headspace gas-chromatography.

Sample Preparation for Aroma Compositions

For aroma compositions with a high TOC, the composition may separate into at least two phases on storage. Thus the composition should be homogenised, e.g. by shaking and/or stirring, prior to analysis.

If the TOC of the aroma composition is more than 25 ppm, it should be diluted in de-ionised water (20° C.) to give a TOC of 25 ppm.

Sample Preparation for Ready-to-Drink Tea

Ready-to-drink tea is analysed without any dilution.

Sample Preparation for Leaf Tea Products

A portion of the leaf (2.00 g) is placed in a vacuum flask. Freshly boiled Highland Spring™ mineral water (200 ml) is added, the flask sealed and then gently swirled for 5 seconds to mix the infusion. The flask is left for 3 minutes after which it is gently swirled once more for 5 seconds. After 4 minutes the infusion is emptied from the flask and the leaf removed by filtration through a double layer of muslin. The infusion is then collected in a bottle, capped and cooled in cold water to room temperature (20° C.).

Analysis

Samples (10.0 g) are placed in headspace vials, capped and analysed using a Perkin Elmer GC fitted with a HS40XL headspace auto sampler and a cryo-focussing unit. The sample of headspace is taken after the sample is incubated at 65° C. for 20 minutes. The headspace sample is then transferred to the GC which is fitted with a Carbowax™ column. External standards are used to monitor the performance of the headspace autosampler and retention times on the GC column.

SUMMARY OF THE INVENTION

In a first aspect the present invention provides a method of manufacturing a green tea product with enhanced aroma, the method comprising the steps of:
(a) providing an aroma composition comprising E-2-hexenal and linalool in a weight ratio of at least 0.7:1; and
(b) combining the aroma composition with the tea product.

Surprisingly, we have found that such a method actually allows for the provision of green tea beverages with an aroma enriched in floral and citrus notes and/or reduced in the green notes typical of low-quality teas.

In a further aspect the present invention provides a green tea product with enhanced aroma. The green tea product may be a ready-to-drink tea comprising E-2-hexenal and linalool in a weight ratio of at least 0.7:1, or a leaf tea product which is infusable in water to provide a ready-to-drink tea comprising E-2-hexenal and linalool in a weight ratio of at least 0.7:1.

The present invention also provides the green tea product of the invention obtained and/or obtainable by the method of the invention.

DETAILED DESCRIPTION

The Method

The method comprises the steps of:
(a) providing an aroma composition comprising E-2-hexenal and linalool in a weight ratio-of at-least 0.7:1; and
(b) combining the aroma composition with the tea product.

Providing the Aroma Composition

The aroma composition of the present invention comprises a relatively high proportion of E-2-hexenal such that the E-2-hexenal and linalool weight ratio is at least 0.7:1. In fact we have found that green tea products with enhanced aroma may be produced with aroma compositions having a weight ratio of E-2-hexenal to linalool of at least from 0.8:1, more preferably at least 0.9:1.

To avoid the aroma being too unbalanced, however it is preferred that the weight ratio of E-2-hexenal to linalool is less than 10:1, more preferably less than 5:1 and most preferably less than 3:1.

The aroma composition is preferably provided as a concentrate as this allows for combining the aroma composition with the tea product with minimal change to the concentration of the non-aroma components of the tea product. In particular, it is preferred that the aroma composition has an aroma content (in terms of TOC) in the range of 5000 mg/l to 900 g/l, more preferably in the range 10 g/l to 800 g/l and most preferably in the range 100 g/l to 700 g/l. Alternatively or additionally, the aroma composition may comprise E-2-hexenal in an amount of at least 1000 ppm, more preferably from 3000 to 10000 ppm. The aroma composition may also comprise linalool in an amount of at least 1000 ppm, more preferably from 2000 to 8000 ppm.

In a preferred embodiment, the aroma composition also comprises additional aroma compounds such as acetaldehyde, 2-methyl-propanal, methanol, 2-methyl-butanal, 3-methyl-butanal, 1-penten-3-one, hexanal, 1-penten-3-ol, Z-2-penten-1-ol, hexan-1-ol, Z-3-hexenol, E-2-hexenol, cis-linalool oxide, trans-linalool oxide, methyl salicylate, Z-3-hexenyl acetate and mixtures thereof.

To avoid the aroma having too much of a "black tea" character, it is preferred that the amount of methyl-butanals and/or linalool oxides is not too high. In particular it is preferred that the aroma composition comprises linaool oxides in an amount such that the weight ratio of linalool to total linalool oxides is at least 0.75:1, more preferably at least 1:1 and most preferably from 1.5:1 to 10:1. By "total linalool oxides" is meant the sum of cis-linalool oxide and trans-linalool oxide. Alternatively or additionally, it is preferred that the aroma composition comprises methyl-butanals in an amount such that the weight ratio of linalool to total methyl-butanals is at least 5:1, more preferably at least 10:1 and most preferably from 20:1 to 200:1. By "total methyl-butanals" is meant the sum of 2-methyl-butanal and 3-methyl-butanal.

To avoid the aroma having too much of a "green" character it is preferred that the amount of Z-3-hexenyl acetate is not too high. In particular it is preferred that the aroma composition comprises Z-3-hexenyl acetate in an amount such that the weight ratio of linalool to Z-3-hexenyl acetate is at least 5:1, more preferably at least 10:1 and most preferably from 50:1 to 100000:1.

We have found that aroma compositions particularly suitable for use in the present invention are those derived from tea, especially fresh tea leaf. The use of fresh tea rather than made tea provides a unique aroma profile, as the fresh tea has not been subjected to the firing required for producing made tea in which aroma is both lost and chemically altered. Thus it is preferred that the aroma composition is provided by a process comprising recovering aroma from fresh tea leaf.

In its simplest form, the fresh tea leaf may be provided in freshly plucked form, i.e. without any further, processing. The fresh tea leaf preferably comprises leaf and stem material. Most preferably the fresh tea leaf comprises actively growing buds, e.g. in the form of the first two or three leaves together with the unopened bud (so-called "two-and-a-bud" and/or "three-and-a-bud" material).

The fresh tea leaf may be withered and/or partially fermented prior to recovery of the aroma. Withering and fermentation are typical processes in black tea manufacture and have been shown to lead to enhancement of the E-2-hexenal content of the tea (see N. Togari et al., *Food Research International,* 1995, 28, pp. 495-502). Furthermore, withering largely eliminates green notes such as Z-3-hexenyl acetate.

In a preferred embodiment, the aroma composition is recovered from substantially unfermented leaf to minimise introduction of aromas typical of black tea such as linalool oxides and/or methyl-butanals. Although the substantially unfermented leaf may have been heat-treated in order to arrest and/or prevent fermentation, it is preferred that the aroma is recovered from fresh leaf that has not been subjected to the high temperatures required in such heat treatments. This is because such high temperatures would drive off some of the aroma and/or cause chemical changes to the aroma. The substantially unfermented leaf may be withered prior to recovery of the aroma composition to eliminate unwanted green notes.

The fresh tea leaf may additionally or alternatively be macerated prior to recovering the aroma. Maceration involves wounding the leaves e.g. by rolling and/or crushing the leaves i.e. to break down the plant tissue structure. Maceration helps to induce volatile production, notably production of the C6 aldehydes hexanal and hexenal. In black tea manufacture, maceration also has the effect of liberating fermentable substrates and fermenting enzymes from within the plant cells and tissue. The maceration is preferably achieved by passing the fresh tea leaves through a cutting machine. Thus for the purpose of the invention the fresh tea leaves may be macerated by a maceration process using a CTC, rotorvane, ball mill or a grinder or a hammer mill or a Lawri tea processor or a Legg cutting machine or rolled using tea rollers as in orthodox tea processing. Combinations of these maceration processes may also be used.

The aroma may be recovered while at least partially drying the fresh leaf. However it is preferred that the fresh leaf is not dried to a moisture content of less than 30% by weight, more preferably not dried to less than 35%, even more preferably not dried to less than 40% and most preferably not dried to less than 45% whilst collecting the aroma. This is because drying to low moisture contents requires high temperatures and/or long times which allows for chemical changes to occur in the aroma, such as the formation of Maillard products.

If the aroma is recovered whilst at least partially drying the fresh tea leaf, it is preferred that a low-convection dryer is used. As used herein the term "low-convection dryer" refers to those types of dryers in which the amount of inlet non-condensable gas is less than 20 kg per kg of water evaporated, preferably less than 5 kg per kg of water evaporated, more preferably less than 1.0 kg per kg of water evaporated, more preferably still less than 0.5 kg per kg of water evaporated, and most preferably between 0.001 and 0.05 kg per kg of water evaporated. The term "non-condensable gas" refers to those substances with a boiling point of less than $-10°$ C., more preferably less than $-20°$ C. and most preferably less than $-35°$ C. at atmospheric pressure. The non-condensable gas is usually air.

Suitable dryers include one or more of batch & continuous models of dryers such as vacuum dryers, rotary vacuum dryers, vacuum plate dryer, superheated steam dryers, hollow flight evaporators or jacketed screw evaporators. In most of these types of dryers, the heat is transferred by conduction from the surface of the dryers. It is preferred that the heat transfer surface temperature of the low-convection dryers is in the range of 40 to 150° C., more preferably in the range of 90 to 140° C. When dried in the low-convection dryer, it is desirable that the fresh tea leaf is not heated to a temperature higher than 70° C. and is preferably heated to a temperature in the range of 30 to 55° C.

The drying in the low-convection dryer is preferably carried out under vacuum. The preferred ranges of vacuum are such that the pressure is less than 0.3 atmospheres absolute, more preferably in the range of 0.01 to 0.15 atmospheres absolute, most preferably in the range 0.05 to 0.15 atmospheres absolute.

The time over which the aroma is recovered from fresh leaf tea (e.g. by drying in one or more low-convection dryers) is typically less than eight hours, more preferably less than five hours, further more preferably in the range of 5 minutes to 5 hours. The time taken for aroma recovery is dependent on the type and size of dryer employed. When a batch type of dryer is used, the aroma recovery time is preferably in the range of 1 to 5 hours. When a continuous drying unit is used, sufficient aroma could be recovered in 5 to 30 minutes of residence time of the tea in the dryer or dryers.

The aroma is preferably recovered from the fresh leaf as a condensate. For example, where a low-convection dryer is employed, the exhaust gases from the dryer are directed to a condenser and the aroma compounds along with the water are condensed using a condenser temperature of less than 50° C., preferably less than 35° C., further more preferably in the range of $-5°$ C. to 30° C.

The condensate obtained may be concentrated by any one of the known processes. For example, the aroma may be concentrated by reverse osmosis, distillation, cryoconcentration, freeze drying, and/or staged/partial condensation to prepare a tea aroma concentrate. It is particularly preferred to use the process of distillation for the concentration.

Alternatively the condensate may be adsorbed on to one or more adsorbents selected from activated charcoal, resins, zeolites, and green tea. The adsorbent may be packed in a column or fluidised bed and later desorbed to release the aroma components using thermal treatment, organic solvents or super critical $CO_2$. When the exhaust gases are adsorbed on to tea itself, further desorption is not necessary.

Combining the Aroma Composition with the Tea Product

The aroma composition is combined with a green tea product. The tea product may be a leaf tea product or a ready-to-drink tea.

The aroma composition is preferably combined with a leaf tea product in a weight ratio of from 1:1000 to 1:1, more preferably from 1:500 to 1:10 and most preferably from 1:200 to 1:50. The aroma may be combined with the leaf tea product by any convenient means but in a preferred embodiment the aroma is sprayed onto the leaf tea product.

The aroma composition is preferably combined with ready-to-drink tea in a weight ratio of from 1:500000 to 1:300, more preferably from 1:100000 to 1:1000 and most preferably from 1:50000 to 1:2000. It is preferred that the amount of added aroma in the ready to drink tea is such as to provide at least 10 ppm TOC (i.e. 10 mg of total organic carbon per liter of beverage), more preferably the amount of added aroma is in the range 50 to 2000 ppm, more preferably still in the range 75 to 750 ppm, and most preferably in the range 100 to 500 ppm.

It is preferred that the tea product is not decaffeinated because decaffeination alters the aroma profile.

Green Tea Product with Enhanced Aroma

The green tea product with enhanced aroma may be a ready-to-drink tea comprising E-2-hexenal and linalool in a weight ratio of at least 0.7:1, or a leaf tea product which is infusible in water to provide the ready-to-drink tea.

Surprisingly, we have found that such ready-to-drink teas have an aroma enriched in floral and citrus notes and reduced in the green notes typical of low-quality teas.

The ready-to-drink tea may have a weight ratio of E-2-hexenal to linalool of at least from 0.8:1, more preferably at least 0.9:1 and still retain an enhanced aroma. To avoid the aroma being too unbalanced, however, it is preferred that the weight ratio of E-2-hexenal to linalool is less than 10:1, more preferably less than 5:1 and most preferably less than 3:1.

The aroma is particularly striking when the ready-to-drink tea comprises E-2-hexenal in an amount of at least 50 ppb, more preferably from 100 to 500 ppb. The ready-to-drink tea may also comprise linalool in an amount of at least 50 ppb, more preferably from 100 to 500 ppb.

In a preferred embodiment, the ready-to-drink tea comprises additional aroma compounds such as acetaldehyde, 2-methyl-propanal, methanol, 2-methyl-butanal, 3-methyl-butanal, t-penten-3-one, hexanal, 1-penten-3-ol, Z-2-penten-1-ol, hexan-1-ol, Z-3-hexenol, E-2-hexenol, cis-linalool oxide, trans-linalool oxide, methyl salicylate, Z-3-hexenyl acetate and mixtures thereof.

To avoid the aroma having too much of a "black tea" character, it is preferred that the amount of methyl-butanals and/or linalool oxides is not too high. In particular it is preferred that the ready-to-drink tea comprises linaool oxides in an amount such that the weight ratio of linalool to total linalool oxides is at least 0.75:1, more preferably at least 1:1 and most preferably from 1.5:1 to 10:1. By "total linalool oxides" is meant the sum of cis-linalool oxide and trans-linalool oxide. Alternatively or additionally, it is preferred that the ready-to-drink tea comprises methyl-butanals in an amount such that the weight ratio of linalool to total methyl-butanals is at least 5:1, more preferably at least 10:1 and most preferably from 20:1 to 200:1. By "total methyl-butanals" is meant the sum of 2-methyl-butanal and 3-methyl-butanal.

To avoid the aroma having too much of a "green" character it is preferred that the amount of Z-3-hexenyl acetate is not too high. In particular it is preferred that the ready-to-drink tea comprises Z-3-hexenyl acetate in an amount such that the weight ratio of linalool to Z-3-hexenyl acetate is at least 5:1, more preferably at least 10:1 and most preferably from 50:1 to 100000:1.

In a preferred embodiment the linalool, E-2-hexenal and/or additional aroma compounds are present in the tea product with enhanced aroma as part of an added aroma composition, preferably an added aroma composition derived from tea.

EXAMPLES

The present invention will be further described with reference to the following examples.

Example 1

This Example demonstrates the production of an aroma composition suitable for use in the invention.

Freshly-plucked leaf from *Camellia sinensis* var. *assamica* with a moisture content of 76-80% by weight was withered to a moisture content of 68-72% by weight. The withered leaf was then macerated using a rotorvane and three passes through a CTC (crush, tear and curl) machine.

The macerated fresh leaf from just after the third CTC cut was collected and immediately (within 10 minutes) loaded into a rotary vacuum dryer (RVD). The operating conditions of the RVD were vacuum pressure −500 mmHg; solids temperature 45-50° C.; inlet cooling water temperature of 15-20° C. and outlet cooling water temperature of 25° C. The leaf was dried in the RVD for 1 hour, collecting a total of 25 liters condensate (per 100 kg macerated leaf) in 5 liter batches approximately every 10 minutes. The condensate was stored at 4° C.

The condensate was distilled in a 100 liter batch. This gave around 1 liter of distillate. The resulting aroma composition was then stored at 4° C.

The major components of the aroma composition are given in Table 1.

TABLE 1

| Compound | Concentration (ppm) |
| --- | --- |
| Methanol | 12900 |
| E-2-hexenal | 6280 |
| Linalool | 3170 |
| Z-3-hexenol | 1070 |
| trans-linalool oxide | 973 |
| Methyl salicylate | 833 |
| Hexanal | 509 |
| E-2-hexenol | 492 |
| Acetaldehyde | 365 |
| Z-2-penten-1-ol | 344 |
| cis-linalool oxide | 339 |
| 1--penten-3-ol | 251 |
| hexan-1-ol | 153 |
| 1-penten-3-one | 107 |

Example 2

This Example demonstrates the production of a leaf tea product and a ready-to-drink tea according to the invention.

A portion of made green tea leaf (100 g) was placed in a glass jar and the aroma from Example 1 added dropwise in 5 aliquots with mixing between each addition. The total amount of aroma added was 1.5 ml in 5×0.30 ml aliquots. The jar was then sealed, covered with aluminium foil to exclude daylight and stored at room temperature for 3 days to allow the sample to equilibrate with respect to water and aroma.

The resulting leaf tea product with enhanced aroma was then infused in water according to the method set out under "DETERMINATION OF AROMA COMPOUNDS" hereinabove. The major aroma compounds detected in the resulting ready-to-drink tea are given in Table 2.

TABLE 2

| Compound | Concentration (ppb) |
| --- | --- |
| Methanol | 2016 |
| E-2-hexenal | 234 |
| Linalool | 191 |
| Z-3-hexenol | 109 |
| trans-linalool oxide | 111 |
| Methyl salicylate | 81 |
| Hexanal | 26 |
| E-2-hexenol | 46 |
| Acetaldehyde | 86 |

TABLE 2-continued

| Compound | Concentration (ppb) |
|---|---|
| Z-2-penten-1-ol | 30 |
| cis-linalool oxide | 40 |
| 1-penten-3-ol | 25 |
| hexan-1-ol | 12 |
| 1-penten-3-one | 56 |

Example 3

This Example demonstrates the enhanced aroma of the products of the invention.

Four samples (A-D) were subjected to quantitative descriptive analysis (QDA) by a trained sensory panel. Sample A was an infusion of made green tea with no added aroma. Samples B and C were infusions prepared from the same made tea as Sample A, but with varying amounts of the aroma of Example 1 added to the leaf.

Sample D was identical to Sample A except that the aroma of Example 1 was added directly to the infusion.

Sample Preparation

All samples were brewed in jugs at 10 g leaf per liter of boiling water, using a 2 min static brew, and stirring once at the end of 2 mins with a stainless steel spoon. After brewing, the samples were strained through 2 layers of muslin to remove the leaf and transferred to vacuum flasks.

For Sample D, 800 ml aliquots of Sample A were measured into empty vacuum flasks and the appropriate volume of aroma added. The flasks were up-turned twice to ensure dispersal of aroma throughout the liquor.

A summary of the aroma content of the samples is given in Table 3.

TABLE 3

| Sample | Quantity of Aroma Added |
|---|---|
| A | None |
| B | 7.5 μl/2 g leaf |
| C | 30 μl/2 g leaf |
| D | 7.5 μl/200 ml liquor |

The samples were prepared fresh for each session and stored in vacuum flasks throughout each session. Panellists were served 100 ml of the tea liquor in white china bowls.

Experimental Design & Assessment Conditions

A fully randomised design was adopted such that each panellist assessed each sample three times. Three sessions were held over two days. All 4 samples were prepared for each session, with each panellist assessing all 4 samples.

Panellists received an open control, at the beginning of each session. This control consisted of Lipton USA Green™ brewed at 10 g/l for 2 mins (stirring once after 2 mins).

All attributes were assessed under white lights. A soup-spoon was provided for the assessment of samples. Water, melon and crackers were also provided for palate cleansing between samples.

Trained panellists evaluated the samples using a 10 cm line scale, for 39 attributes.

Results

The significant differences for Samples B-D over Sample A are summarised in Table 4.

TABLE 4

| Sample | Differences Compared with Sample A |
|---|---|
| B | Higher levels of fruity* aroma, floral aroma and fruity flavour. Lower vegetable aroma, sweetcorn aroma, tobacco aroma, cereal aroma, fishy aroma, metallic taste, and bitterness aftertaste. |
| C | Higher levels of overall aroma, fruity* aroma, floral aroma, fruity flavour, and floral flavour. Lower levels of vegetable aroma, sweetcorn aroma, tobacco aroma, cereal aroma, fishy aroma, darkness, metallic taste, astringency and bitterness aftertaste. |
| D | Lower levels of vegetable aroma, tobacco aroma, cloudyness, darkness, metallic taste, astringency and bitterness aftertaste. |

*Described as "citrus" by the panellists.

The results in Table 4 clearly show that addition of the aroma of Example 1 to green tea products results in improved aroma either in terms of increased clear floral and citrus notes and/or reduction of some of the characteristic green tea notes usually found in low-quality green tea (e.g. vegetable aroma, sweetcorn aroma).

The invention claimed is:

1. A method of manufacturing a green tea product with enhanced aroma, the method comprising the steps of:
   (a) providing an aroma composition comprising E-2-hexenal and linalool in a weight ratio of at least 0.7:1; and
   (b) combining the aroma composition with a green tea leaf product.

2. A method according to claim 1 wherein the E-2-hexenal and linalool weight ratio is from 0.8:1 to 10:1.

3. A method according to claim 1 wherein the aroma composition comprises E-2-hexenal in an amount of at least 1000 ppm.

4. A method according to claim 1 wherein the aroma composition comprises linalool in an amount of at least 1000 ppm.

5. A method according to claim 1 wherein the aroma composition is provided by a process comprising recovering aroma from fresh tea leaf.

6. A method according to claim 5 wherein the aroma is recovered from fresh leaf that has been withered.

7. A method according to claim 5 wherein the aroma is recovered from substantially unfermented fresh leaf.

8. A method according to claim 5 wherein the aroma is recovered from fresh leaf that has not been heat-treated in order to arrest and/or prevent fermentation.

9. A method of claim 1 further comprising infusing green tea leaf product in water to provide a ready-to-drink tea comprising E-2-hexenal and linalool in a weight ratio of at least 0.7:1.

10. A method according to claim 9 wherein the E-2-hexenal and linalool weight ratio is from 0.8:1 to 10:1.

11. A method according to claim 9 wherein the ready-to-drink tea comprises E-2-hexenal in an amount of at least 50 ppb.

12. A method according to claim 9 wherein the ready-to-drink tea comprises linalool in an amount of at least 50 ppb.

13. A method according to claim 9 wherein the E-2-hexenal and linalool weight ratio is from 0.9:1 to 5:1.

14. A method according to claim 9 wherein the ready-to-drink tea comprises E-2-hexenal in an amount of from 100 to 500 ppb.

15. A method according to claim 9 wherein the ready-to-drink tea comprises linalool in an amount of from 100 to 500 ppb.

16. A method according to claim 1 wherein the E-2-hexenal and linalool weight ratio is from 0.9:1 to 5:1.

17. A method according to claim 1 wherein the aroma composition comprises E-2-hexenal in an amount of from 3000 to 10000 ppm.

18. A method according to claim 1 wherein the aroma composition comprises linalool in an amount of from 2000 to 8000 ppm.

* * * * *